(12) United States Patent
Davidsen et al.

(10) Patent No.: US 7,795,784 B2
(45) Date of Patent: Sep. 14, 2010

(54) REDISTRIBUTION INTERCONNECT FOR MICROBEAMFORMING(S) AND A MEDICAL ULTRASOUND SYSTEM

(75) Inventors: Richard Davidsen, Everett, WA (US); Andrew L. Robinson, Bellevue, WA (US); Wojtek Sudol, Andover, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 588 days.

(21) Appl. No.: 11/813,259

(22) PCT Filed: Jan. 9, 2006

(86) PCT No.: PCT/IB2006/050078
§ 371 (c)(1),
(2), (4) Date: Jul. 2, 2007

(87) PCT Pub. No.: WO2006/075283
PCT Pub. Date: Jul. 20, 2006

(65) Prior Publication Data
US 2008/0106976 A1 May 8, 2008

Related U.S. Application Data

(60) Provisional application No. 60/642,911, filed on Jan. 11, 2005.

(51) Int. Cl.
*H01L 41/08* (2006.01)
(52) U.S. Cl. .................................... 310/334
(58) Field of Classification Search ............ 310/334
See application file for complete search history.

(56) References Cited

U.S. PATENT DOCUMENTS

| 4,686,408 | A | * | 8/1987 | Ishiyama ............... 310/334 |
| 5,267,221 | A | | 11/1993 | Miller |
| 5,427,106 | A | * | 6/1995 | Breimesser et al. ........ 600/447 |
| 5,693,181 | A | | 12/1997 | Bernstein |
| 6,044,533 | A | | 4/2000 | Bureau |
| 6,541,896 | B1 | | 4/2003 | Piel |
| 6,589,180 | B2 | | 7/2003 | Erikson |

(Continued)

FOREIGN PATENT DOCUMENTS

EP 0853919 A 7/1998

*Primary Examiner*—Thomas M Dougherty
(74) *Attorney, Agent, or Firm*—W. Brinton Yorks, Jr.

(57) ABSTRACT

An ultrasound transducer includes one or more microbeamformer integrated circuit chips, an array of acoustic elements, and a redistribution interconnect coupled via conductive elements between the one or more integrated circuit chips and the array of acoustic elements. The one or more microbeamformer integrated circuit chips each include a plurality of bond pads separated from adjacent ones thereof by a first pitch set. The acoustic elements of the array are separated from adjacent ones thereof by a second pitch set, the second pitch set being different from the first pitch set. In addition, the redistribution interconnect couples on a first side of the redistribution interconnect to the one or more microbeamformer integrated circuit chips via conductive elements. The redistribution interconnect couples on a second side to the array of transducer elements via conductive elements. The redistribution interconnect provides an interconnection between the bond pads of the one or more microbeamformer integrated circuit chips with the first pitch set with corresponding ones of the acoustic elements of the array with the second pitch set.

25 Claims, 14 Drawing Sheets

U.S. PATENT DOCUMENTS

| | | |
|---|---|---|
| 6,618,916 B1 | 9/2003 | Eberle |
| 2004/0178484 A1* | 9/2004 | Burdick et al. .............. 257/678 |
| 2008/0130415 A1* | 6/2008 | Tai .............................. 367/140 |
| 2008/0229835 A1* | 9/2008 | Davidsen et al. .............. 73/629 |

* cited by examiner

REDISTRIBUTION INTERCONNECT FOR MICROBEAMFORMING(S) AND A MEDICAL ULTRASOUND SYSTEM

The present disclosure relates generally to medical ultrasound systems, and more particularly, to redistribution interconnect for flip-chip microbeamformer(s) and a medical ultrasound system.

In medical ultrasound, transducer arrays are generally used for transmission and reception of ultrasonic or acoustic waves during ultrasound diagnostic imaging. Until recently, most transducer arrays comprised a one-dimensional (1D) array of transducer elements, used to interrogate a substantially two-dimensional region of interest. One-dimensional arrays typically comprise up to a few hundred elements linearly arranged along the azimuthal axis of the array. The timing and amplitude of the electrical signals applied to and received from these elements control focusing and steering in the azimuth direction, while focusing in the orthogonal elevation direction is controlled by the elevation height of the array and the characteristics of a mechanical lens.

More recently, transducer arrays have been developed to provide improved image quality and/or new imaging modes through improved control in the elevation direction. This improved control is obtained by sub-dividing the array elements in the elevation direction, at each position in azimuth. For example, improved image quality for two-dimensional regions of interest can be obtained through use of expanding elevation aperture, elevation focusing, and aberration correction; arrays providing these capabilities are commonly referred to as 1.25D, 1.5D, and 1.75D, respectively. In general, elements in these arrays are several times larger in the elevation direction than in the azimuth direction.

Volumetric imaging, i.e. interrogation of a substantially three-dimensional region of interest, is obtained through use of a 2D array, where the height in elevation of each element is roughly the same as or even smaller than its width in azimuth. While there are significant differences between each of these newer types of transducer arrays, they are all differentiated from conventional arrays by physically comprising a two-dimensional array of transducer elements instead of a one-dimensional array of transducer elements. Further as described here, the terms "two-dimensional" and "2D" are used to refer to the physical arrangement of the elements, and do not imply any aspects of the way these elements are controlled to transmit acoustic beams into and receive acoustic signals from the region of interest.

State of the art two-dimensional arrays generally include a flat array having thousands of transducer elements. In one type of two-dimensional ultrasound transducer design, all transducer elements of an array are attached and individually electrically connected to a surface of an integrated circuit (IC) via "flip-chip" technology using conductive bumps. This "microbeamformer" IC provides electrical control of the elements, such as, for beam forming, signal amplifying, etc., and provides the means of interfacing the thousands of array elements to the ultrasound system which has at most hundreds of signal processing channels. The term "flip-chip" is used here to describe electrical interconnection using small conductive bumps, such as solder balls.

One example of a known design of an ultrasound transducer is illustrated in FIG. 1. The ultrasound transducer 10 includes a flat array of acoustic elements 12 that are coupled to a surface of an integrated circuit 14 via flip-chip conductive bumps 16. A flip-chip underfill material 18 is included within a region between the integrated circuit 14 and the flat array of acoustic elements 12, surrounding the flip-chip conductive bumps 16. Transducer 10 further includes a transducer base 20 and an interconnection cable 22. Interconnection cable 22 is for interconnecting between the integrated circuit 14 and an external cable (not shown). Integrated circuit 14 is electrically coupled to the interconnection cable 22 using techniques known in the art, such as via wirebonded wires 24.

FIG. 2 is a schematic cross-section view of a portion of the ultrasound transducer 10 of FIG. 1, known in the art. The pitch of the bond pads on the microbeamformer IC 14 is the same as the pitch of the elements of the transducer array 12. As discussed herein above, the ultrasound transducer 10 includes a flat array of acoustic elements 12 that are coupled to a surface of an integrated circuit 14 via flip-chip conductive bumps 16. A flip-chip underfill material 18 is included within a region between the integrated circuit 14 and the flat array of acoustic elements 12, surrounding the flip-chip conductive bumps 16.

Flip-chip architecture for microbeamformers offers a number of advantages over other interconnect methods. Unfortunately, the flip-chip architecture alone may not be suitable for all microbeamformer applications. For example, there are applications, such as high-frequency ultrasound transducer arrays, where it may not be possible to fit all of the necessary microbeamformer electronics for an element of the transducer array within the spatial footprint of a single transducer element.

In addition, curved arrays provide a significant challenge to the flip-chip architecture. For example, a curved array does not provide a flat surface to use for flip chip bonding. As a result, using the flip-chip architecture with curved arrays involves significant challenges.

Furthermore, the flip-chip architecture requires that the transducer array and the microbeamformer IC be pitch-matched. As a result, each transducer array must have a unique microbeamformer IC. Accordingly, the requirement of a unique microbeamformer IC undesirably limits re-use opportunities, increases development cost(s), and increases time-to-market.

Still further, chip tiling is a method used to support transducer arrays that are larger than a maximum size of a microbeamformer IC. Chip tiling can permit use of smaller IC chips, with attendant increase in IC fabrication yield and lower cost. However, for increased frequency, the alignment accuracy and tolerance requirements become more stringent.

Accordingly, an improved method and apparatus for a microbeamformer IC with a flip-chip architecture for overcoming the problems in the art is desired.

The embodiments of the present disclosure address the problems noted above by providing a means to decouple the spatial constraints on the microbeamformer integrated circuit chips from the spatial constraints of the transducer array. According to one embodiment of the present disclosure, an ultrasound transducer includes one or more microbeamformer integrated circuit chips, an array of acoustic elements, and redistribution interconnect coupled via flip-chip bumps between the one or more integrated circuit chips and the array of acoustic elements. The one or more microbeamformer integrated circuit chips each include a plurality of bond pads separated from adjacent ones thereof by a first pitch set. The acoustic elements of the array are separated from adjacent ones thereof by a second pitch set, the second pitch set being different from the first pitch set. In addition, the redistribution interconnect couples on a first side to the one or more microbeamformer integrated circuit chips via flip-chip bumps. The redistribution interconnect couples on a second side to the array of transducer elements via flip-chip bumps. The redistribution interconnect provides an interconnection between the bond pads of the one or more microbeamformer integrated circuit chips having the first pitch set with corresponding ones of the acoustic elements of the array having the second pitch set.

According to another embodiment of the present disclosure, an ultrasound transducer includes one or more microbeamformer integrated circuit chips, a curved array of acoustic elements, and redistribution interconnect coupled via flip-chip bumps between the one or more integrated circuit chips and the array of acoustic elements. In this embodiment, the redistribution interconnect provides the geometrical remapping from the curved surface of the transducer array and the flat surface of the one or more microbeamformer integrated circuit chips.

In the figures, like reference numerals refer to like elements. In addition, it is to be noted that the figures may not be drawn to scale.

According to one embodiment, an application-specific interconnect redistribution level is introduced into an acoustic stack of an ultrasound transducer array with a microbeamformer IC. The interconnect redistribution level comprises a redistribution interconnect that is pitch-matched in both azimuth and elevation to the transducer array at one surface of the interconnect redistribution block, and pitch-matched to the microbeamformer IC at a second surface of the interconnect redistribution block, wherein the pitches of the transducer elements of the transducer array in azimuth and in elevation are different from the pitches of corresponding electrical contact points or bond pads of the microbeamformer IC in azimuth and in elevation. In other words, the interconnect redistribution level provides different interconnect pitches on the top and bottom (or alternatively, the sides) of the redistribution interconnect block by patterning interconnect traces in the interconnect layers of the interconnect block and/or aligning metal lines of the interconnect layers with the different pitches on the top and bottom of the interconnect block. In addition, the elevation and azimuth pitches may be different on the same surface, wherein for simplicity, the elevation pitch and the azimuth pitch together can be referred to as the pitch set for the particular surface.

In one embodiment, the interconnection redistribution block comprises a multilayer redistribution interconnect block. The block is built using multiple layers of a planar interconnect, wherein the multiple layers have no interconnects between individual ones of the multiple layers. Each layer includes in-plane patterning, the in-plane patterning providing for a given pitch redistribution of a particular combination of transducer array and microbeamformer (or microbeamformers). In addition, each layer of the planar interconnect can be fabricated, for example, using conventional printed circuit board (PCB) and/or flexible circuit board fabrication techniques.

Figure 3A:
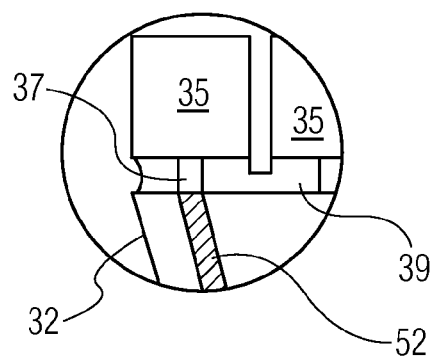
FIG. 3 is a plan view of an ultrasound transducer featuring a redistribution interconnect according to one embodiment of the present disclosure.
Figure 3:
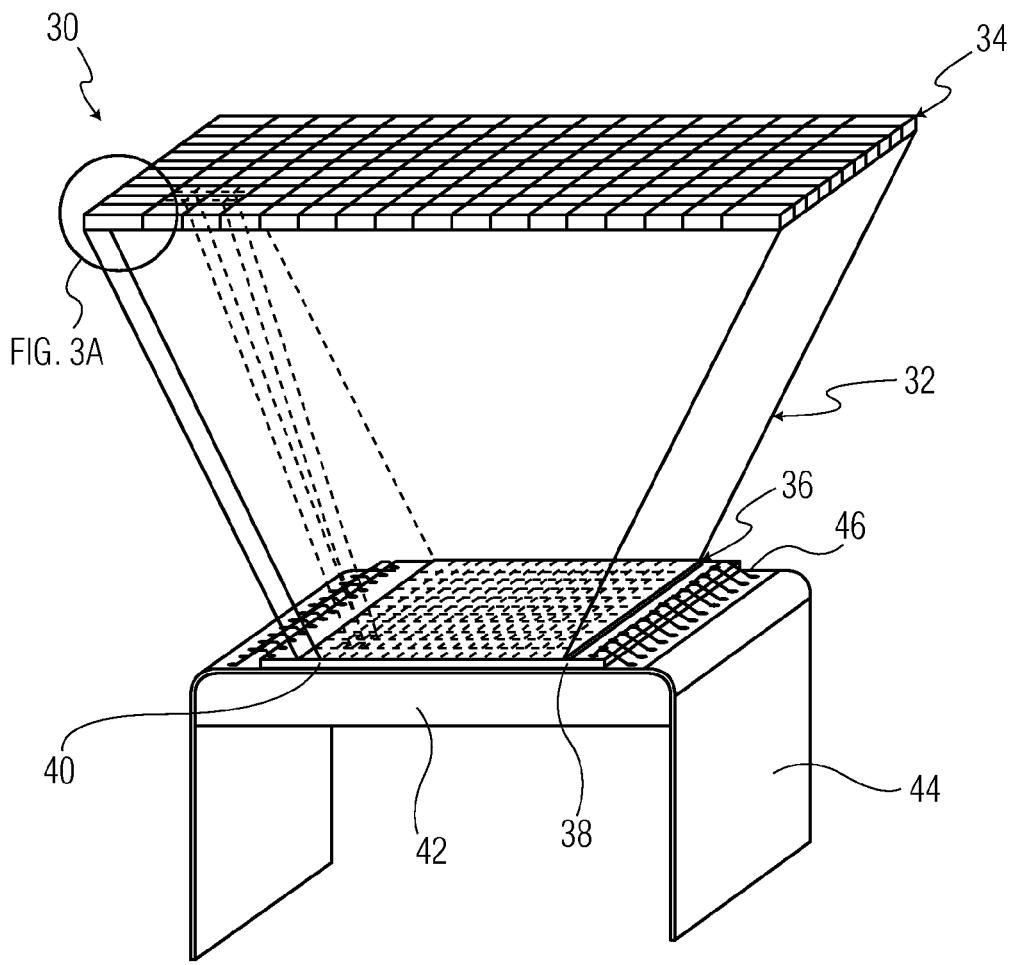

FIG. 3 is a plan view of an ultrasound transducer 30 featuring a redistribution interconnect (or interconnecting block) 32 according to one embodiment of the present disclosure. The interconnecting block 32 enables the connecting of an array of acoustic elements 34 having an array foot-print that differs from a foot-print of flip-chip connections 36 of the microbeamformer IC 38. In one embodiment, the interconnecting block 32 of FIG. 3 is produced, for example, by laminating a number of printed circuit boards, or using another similar process, as discussed further herein. It is also possible to form the interconnecting block 32 in a substantially three-dimensional manner, by creating a three-dimensional wire frame (for example, using stereolithography) and filling the space between the wires with a suitable insulating material, such as an epoxy.

In one embodiment, ultrasound transducer 30 includes a flat array of acoustic elements 34 that are coupled to a surface of a microbeamformer integrated circuit 38 via interconnecting block 32 and flip-chip conductive bumps. In particular, the transducer elements of the flat array of acoustic elements 34 are coupled to a first surface of interconnecting block 32 via flip-chip conductive bumps, for example, as illustrated in the bubble view in FIG. 3. In the bubble view of FIG. 3, transducer element 35 couples to a conductive trace 52 of interconnect block 32 via flip-chip bump 37, further including a flip-chip underfill material 39. In addition, the bond pads of the microbeamformer IC 38 are coupled to a second surface of interconnecting block 32 via flip-chip conductive bumps 36. A flip-chip underfill material 40 may be included within a region between the integrated circuit 38 and the bottom surface of interconnecting block 32, surrounding the flip-chip conductive bumps 36. Transducer 30 further includes a transducer base 42 and an interconnection cable 44. Interconnection cable 44 is for interconnecting between the integrated circuit 38 and an external cable (not shown). Integrated circuit 38 is electrically coupled to the interconnection cable 44 using techniques known in the art, such as via wirebonded wires 46.

Figure 4:
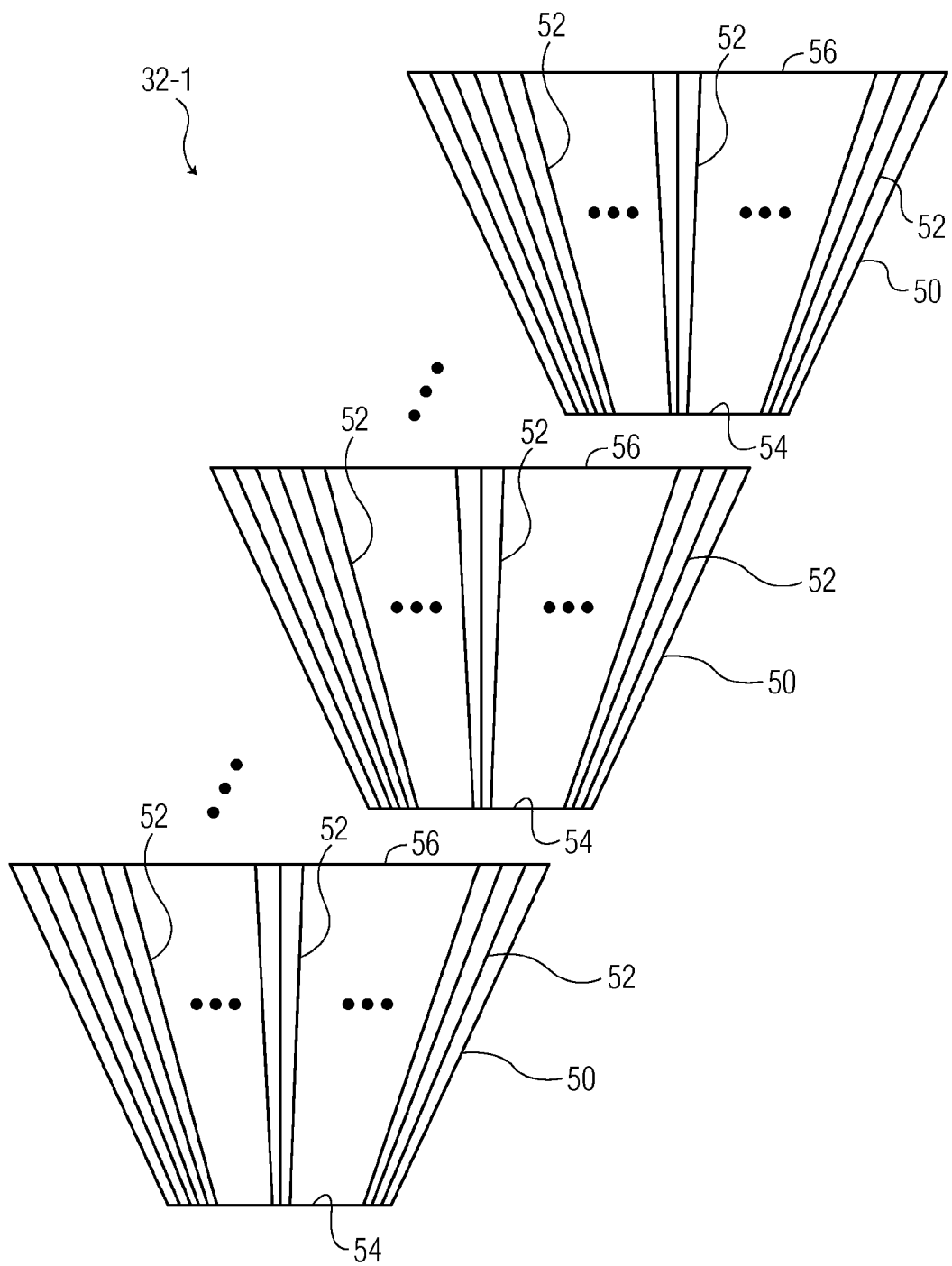
FIG. 4 is an exploded plan view of the redistribution interconnect of FIG. 3 in an azimuth direction according to one embodiment of the present disclosure.

FIG. 4 is an exploded plan view 32-1 of the redistribution interconnect 32 of FIG. 3 according to one embodiment of the present disclosure. In particular, the redistribution interconnect 32-1 comprises a multilayer laminated interconnection block. The laminated interconnection block includes a plurality of interconnect layers 50. Each interconnect layer 50 includes interconnect traces 52 patterned to provide electrical signal redistribution between bond pads of the microbeamformer integrated circuit chip 38 at a first surface 54 and corresponding ones of acoustic elements of the array of acoustic elements 34 at a second surface 56. The interconnect layers 50 further comprise a given thickness dimension and are spaced apart (as may be appropriate) in the areas located proximate the first and second surfaces (54,56) to provide an appropriate spacing of interconnect traces 52 between adjacent ones of the interconnect layers 50 at the respective surfaces. In addition, interconnect layers 50 can comprise flexible printed circuit boards, rigid printed circuit boards, or a combination of flexible and rigid printed circuit boards or other planar structures with patterned interconnect traces.

Spacing of the interconnect layers between adjacent ones thereof can be accomplished, for example, by any suitable spacer material (not shown) as may be appropriate, wherein the spacer material is located at least proximate the first and second surfaces (54,56) to provide the appropriate spacing of interconnect traces 52 between adjacent ones of the interconnect layers in an elevation direction at the respective surfaces. For example, the spacer material may comprise an adhesive, or other suitable material, having an appropriate thickness. Appropriate spacing between adjacent ones of the interconnect layers in the elevation direction at the first surface 54 insures proper alignment of interconnect traces at the first surface with corresponding ones of the bond pads of the microbeamformer IC 38. Furthermore, appropriate spacing between adjacent ones of the interconnect layers in the elevation direction at the second surface 56 insures proper alignment of interconnect traces at the second surface with corresponding ones of the transducer elements of the transducer array 34.

In the embodiment illustrated in FIG. 4, redistribution interconnect 32-1 comprises a multilayer laminated interconnection block. It is noted that the interconnect traces 52 on each individual interconnect layer 50 can provide for redistribution in only one of the elevation or the azimuth directions. As discussed herein above, it may also necessary to provide for interconnect redistribution in the other direction, between interconnection layers. Accordingly, the spaced-apart laminated multiple planar layers of the redistribution interconnect provide for out-of-plane redistribution. In addition to use of spacer material as discussed above, the laminated multilayer block can comprise plates having first and second spacings at the top and bottom of the redistribution interconnect, respectively, to provide necessary spacing between adjacent ones of the planar interconnect layers, further with a gap in-between top and bottom backing plates to allow for the out-of-plane redistribution.

Figure 5:
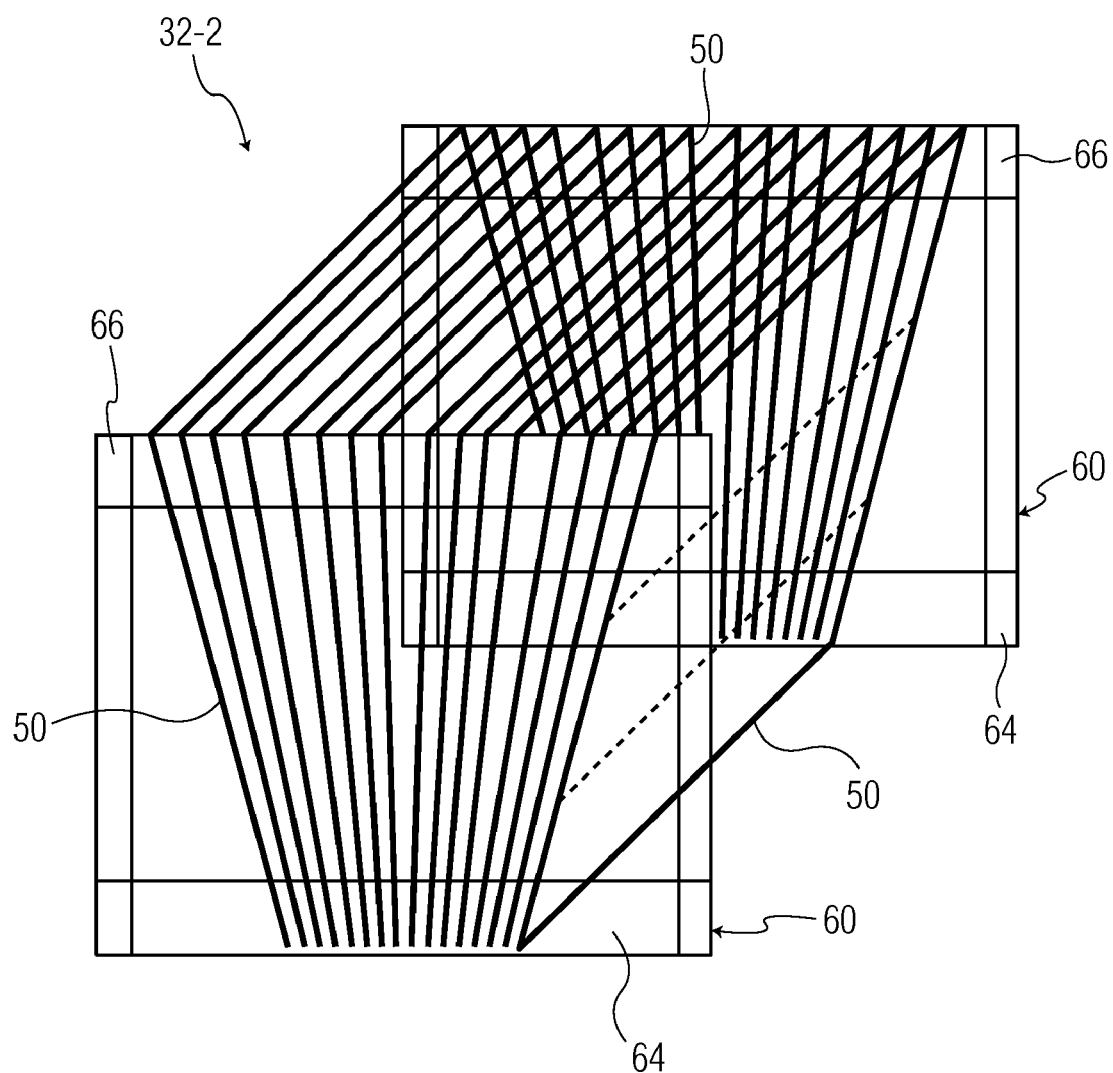
FIG. 5 is a plan view of the redistribution interconnect of FIG. 3 in an elevation direction according to one embodiment of the present disclosure.

FIG. 5 illustrates a technique for accomplishing interconnect redistribution in the direction between interconnect layers. As shown, FIG. 5 is a plan view 32-2 of the redistribution interconnect 32 of FIG. 3 in an elevation direction according to one embodiment of the present disclosure. The interconnect layers 50 are inserted into a frame 60, which spaces the interconnect layers 50 with a first pitch between adjacent interconnects at one end 64 of the frame 60 and with a second pitch between adjacent interconnects at the other end 66 of the frame 60. Epoxy, or another suitable material, is then dispensed into the frame and cured. Subsequent to curing appropriate to the dispensed material, the frame 60 is removed by machining or another suitable process to produce the redistribution interconnect block 32 of FIG. 3.

Alternatively, with respect to the embodiment of FIG. 5, the redistribution interconnect 32-2 could be produced using metal parts cast in a non-conductive material in multiple layers. The multiple layers are then laminated to form the redistribution interconnect. The metal parts may include, for example, a lead frame with multiple metal leads per layer.

Figure 6:
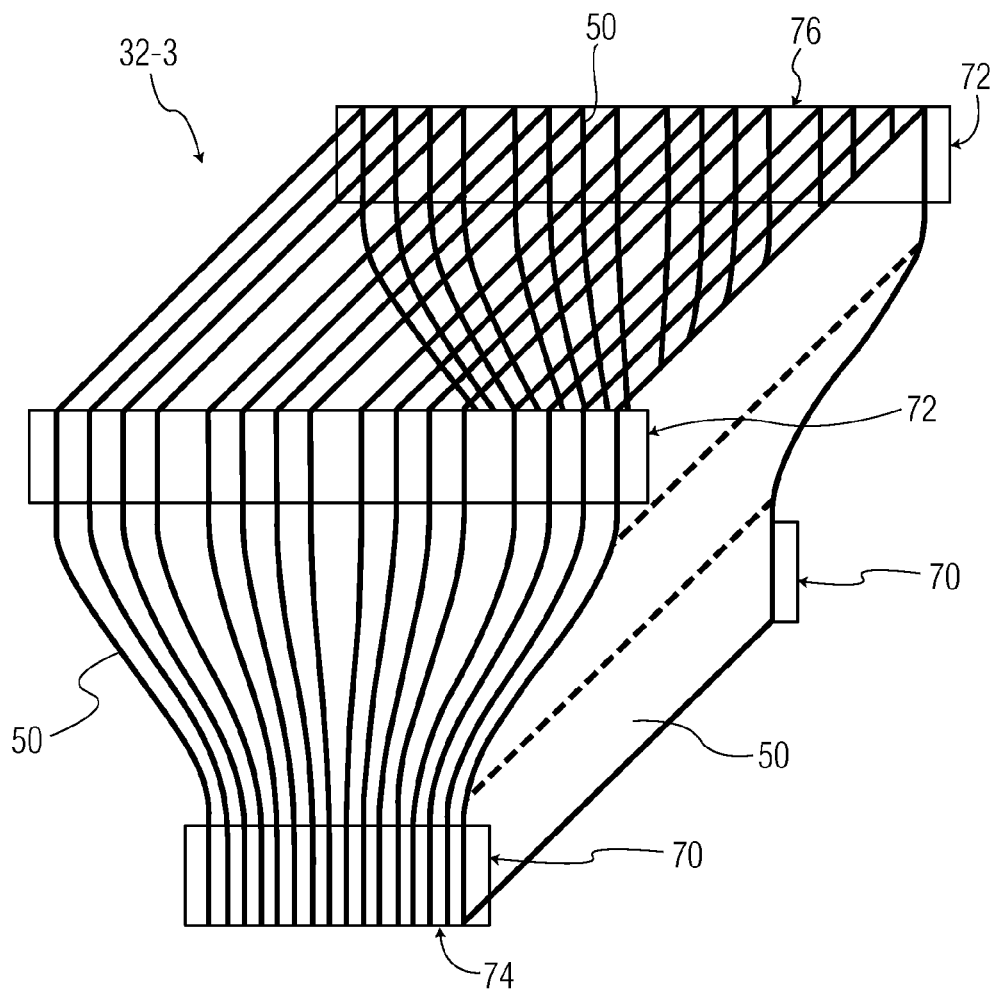
FIG. 6 is a plan view of the redistribution interconnect of FIG. 3 in an elevation direction according to the yet another embodiment of the present disclosure.

FIG. 6 is a plan view of a portion of redistribution interconnect 32-3 in an elevation direction according to the yet another embodiment of the present disclosure. In this embodiment, the redistribution interconnect block is formed by laminating flexible interconnect layers. The interconnect traces (not shown) on each of the interconnect layers 50 provide redistribution in only one of the elevation or the azimuth directions. In this embodiment, redistribution in the other direction is provided by laminating the interconnect layers 50 with different spacers (70,72) at two ends of the interconnect block. The spacers 70 at a first end 74 of the interconnect block 32-3 set the pitch to match that of the bond pads of the microbeamformer IC, while the spacers 72 at the second end 76 of the interconnect block 32-3 set the pitch to match that of the transducer elements of the 2D transducer array (not shown).

In the embodiments presented thus far, the pitch of the array elements has been described as being larger than the pitch of the microbeamformer IC circuits to which the array elements connect through the redistribution interconnect. As noted above, there may also be cases where the pitch of the microbeamformer IC is larger than the pitch of the array elements; for example, high-frequency arrays have small elements where the microbeamformer IC electronics required to support the desired circuit functions may be larger than the array elements.

Figure 7:
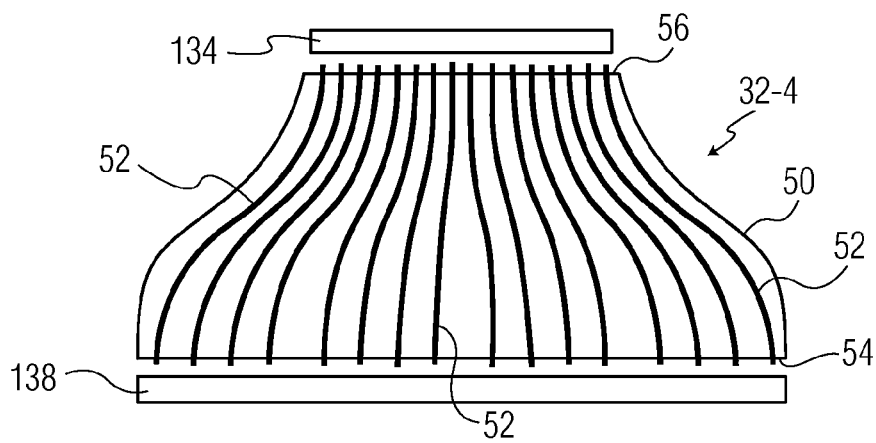
FIG. 7 illustrates a schematic plan view of a portion of a redistribution interconnect in which the microbeamformer pitch is greater than the transducer array pitch according to a further embodiment of the present disclosure.
Figure 8:
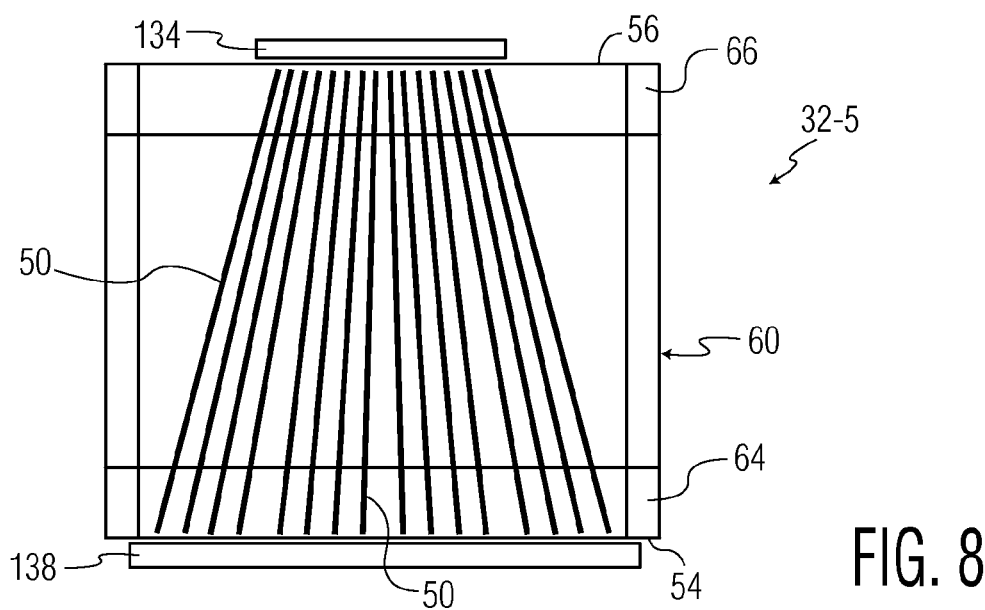
FIG. 8 is a schematic plan view of the redistribution interconnect of FIG. 7 in an elevation direction according to one embodiment of the present disclosure.
Figure 9:
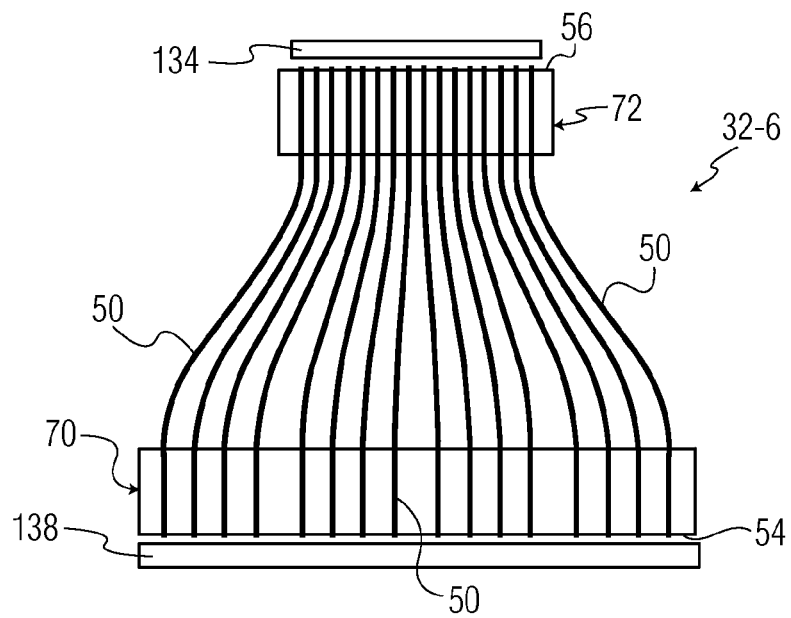
FIG. 9 is a schematic plan view of the redistribution interconnect of FIG. 7 in an elevation direction according to the yet another embodiment of the present disclosure.

The embodiments of the redistribution interconnect illustrated in FIGS. 4-6 may also be used when the array pitch is smaller than the microbeamformer IC pitch. FIGS. 7-9 illustrate schematic plan views of a portion of redistribution interconnect for a microbeamformer IC according to further embodiments of the present disclosure. FIG. 7 illustrates a plan view of a portion of a redistribution interconnect 32-4 in which the microbeamformer pitch is greater than the transducer array pitch. In particular, the redistribution interconnect 32-4 comprises a multilayer laminated interconnection block having a plurality of interconnect layers 50 (only one layer is shown for simplicity). Each interconnect layer 50 includes interconnect traces 52 patterned to provide electrical signal redistribution between bond pads of the microbeamformer integrated circuit chip at a first surface 54 and corresponding ones of acoustic elements of the array of acoustic elements at a second surface 56. As illustrated in FIG. 7, the pitch of the interconnect traces 52 proximate the first surface 54 (corresponding to the microbeamformer IC 138) is greater than the pitch of the interconnect traces 52 proximate the second surface 56 (corresponding to the transducer array 134).

FIG. 8 illustrates a technique for accomplishing interconnect redistribution in the direction between interconnect layers, similarly as discussed herein above with respect to FIG. 5. As shown, FIG. 8 is plan view 32-5 of the redistribution interconnect 32-4 of FIG. 7 in an elevation direction (perpendicular to the azimuth direction) according to one embodiment of the present disclosure. The interconnect layers 50 are inserted into a frame 60, which spaces the interconnect layers 50 with a first pitch between adjacent interconnects at one end 64 of the frame 60 and with a second pitch between adjacent interconnects at the other end 66 of the frame 60. Epoxy, or another suitable material, is then dispensed into the frame and cured. Subsequent to curing appropriate to the dispensed material, the frame 60 is removed by machining or another suitable process. As illustrated in FIG. 8, the pitch of the interconnect layers 50 (and thus the interconnect traces between adjacent interconnect layers) proximate the first surface 54 (corresponding to the microbeamformer IC 138) is greater than the pitch of the interconnect layers 50 (an thus the interconnect traces between adjacent interconnect layers) proximate the second surface 56 (corresponding to the transducer array 134).

FIG. 9 is a plan view of a portion of redistribution interconnect 32-6 in an elevation direction (perpendicular to the azimuth direction) according to the yet another embodiment of the present disclosure, similarly as discussed herein above with respect to FIG. 6. In this embodiment, the redistribution interconnect block is formed by laminating the flexible interconnect layers. The interconnect traces (not shown) on each of the interconnect layers 50 provide redistribution in only one of the elevation or the azimuth directions. In this embodiment, redistribution in the other direction is provided by laminating the interconnect layers 50 with different spacers (70,72) at two ends of the interconnect block. The spacers 70 at a first end 54 of the interconnect block 32-6 set the pitch to match that of the bond pads of the microbeamformer IC 138, while the spacers 72 at the second end 56 of the interconnect block 32-6 set the pitch to match that of the transducer elements of the 2D transducer array 134. As illustrated in FIG. 9, the pitch of the interconnect layers 50 (and thus the interconnect traces between adjacent interconnect layers) proximate the first surface 54 (corresponding to the microbeamformer IC 138) is greater than the pitch of the interconnect layers 50 (an thus the interconnect traces between adjacent interconnect layers) proximate the second surface 56 (corresponding to the transducer array 134).

Figure 10:
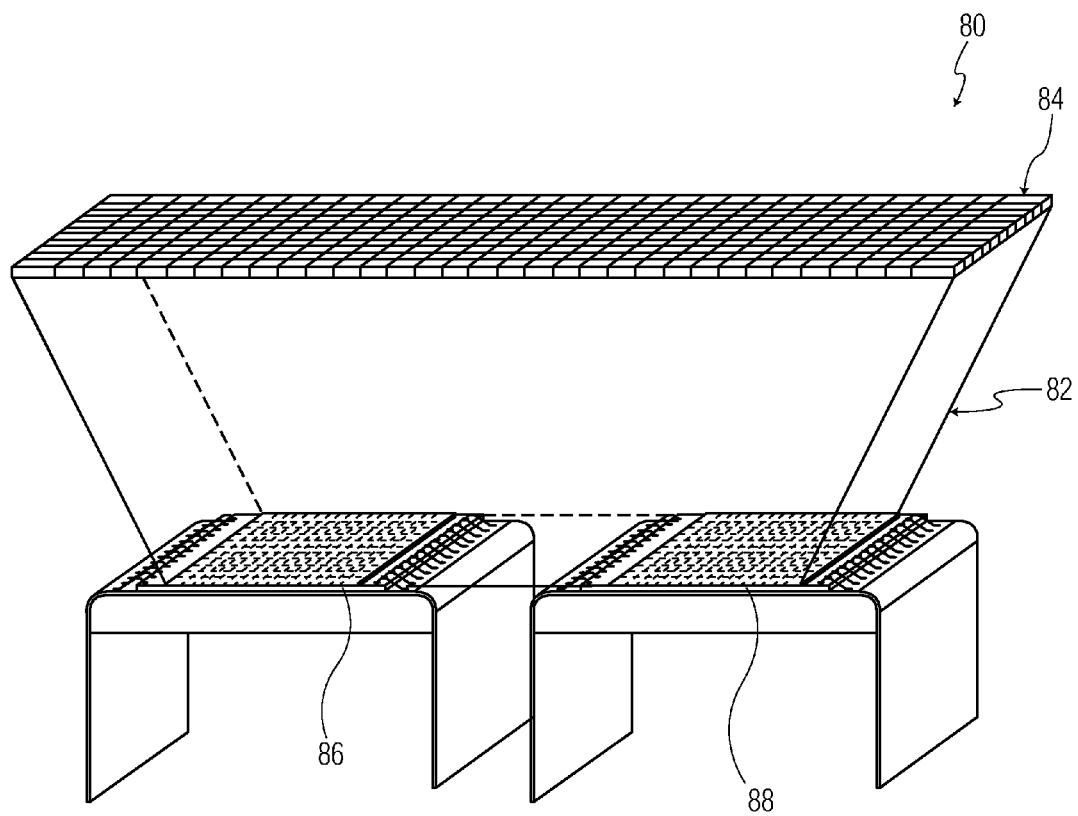
FIG. 10 is a plan view of an ultrasound transducer featuring a redistribution interconnect for two or more microbeamformers according to yet another embodiment of the present disclosure.

FIG. 10 is a plan view of an ultrasound transducer 80 featuring a redistribution interconnect 82 for coupling a transducer array 84 to two or more microbeamformer ICs (86,88) according to yet another embodiment of the present disclosure. In this embodiment, a single transducer array 84 and multiple microbeamformer IC's (86,88) are connected to the redistribution interconnect (or interconnecting block) 82. The redistribution interconnect 82 can comprise one similar to the embodiments described herein with respect to FIGS. 4-6, wherein redistribution interconnect 82 is configured for providing the required pitch matching for the bond pads of the multiple microbeamformer IC's (86,88) at a first side, while providing the required pitch matching for the transducer elements of the 2D transducer array 84 at a second side. Accordingly, this embodiment enables the fabrication of very large element count transducers. In addition, more than two microbeamformer ICs may be used.

Figure 11:
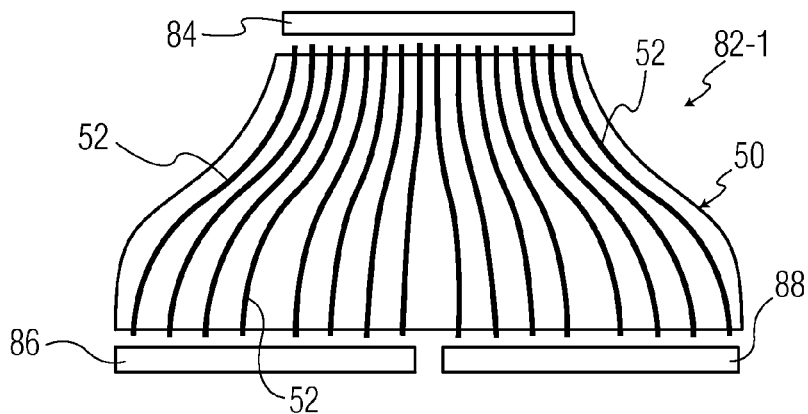
FIGS. 11-13 illustrate schematic plan views of a portion of a redistribution interconnect for two or more microbeamformers according to the further embodiments of the present disclosure.
Figure 12:
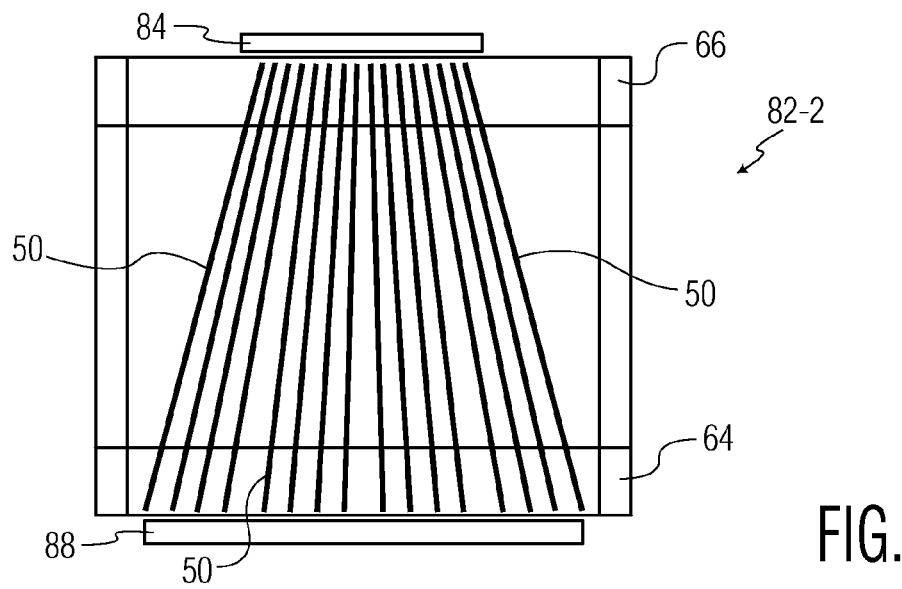
Figure 13:
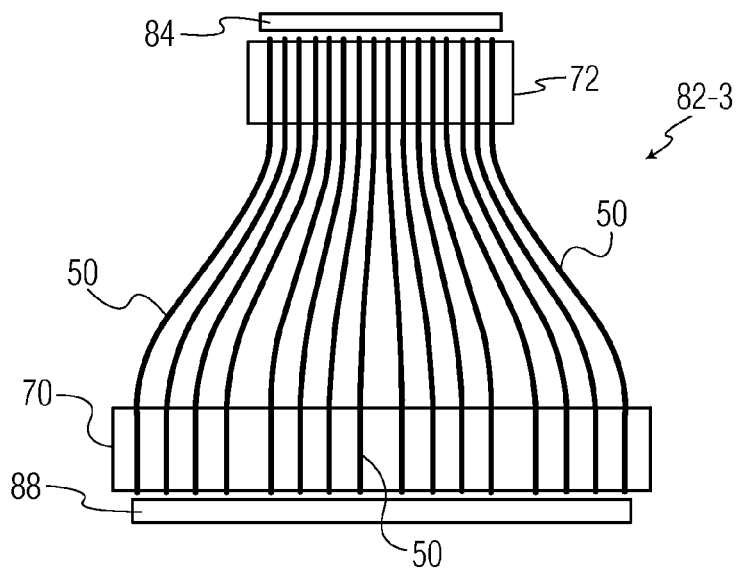

FIGS. 11-13 illustrate schematic plan views of a portion of redistribution interconnect 82-1, 82-2, and 82-3, respectively, for two or more microbeamformer ICs (86,88) according to further embodiments of the present disclosure. The embodiment of FIG. 11 is similar to that of FIG. 4 including a multilayered printed circuit board laminate with the following differences. In this embodiment, the pitch of the transducer array elements is less than the pitch of the bond pads of two or more tiled microbeamformer ICs (86,88).

The embodiment of FIG. 12 is similar to that of FIG. 5 including laminated layers of metal parts cast in a non-conductive material with the following differences. In this embodiment, the pitch of the transducer array elements is less than the pitch of the bond pads of the two or more microbeamformer ICs (86,88).

The embodiment of FIG. 13 is similar to that of FIG. 6 with laminated interconnect layers 50 and spacers (70,72) with the following differences. In this embodiment, the pitch of the transducer array elements is less than the pitch of the bond pads of the two or more microbeamformer ICs (86,88).

Figure 14:
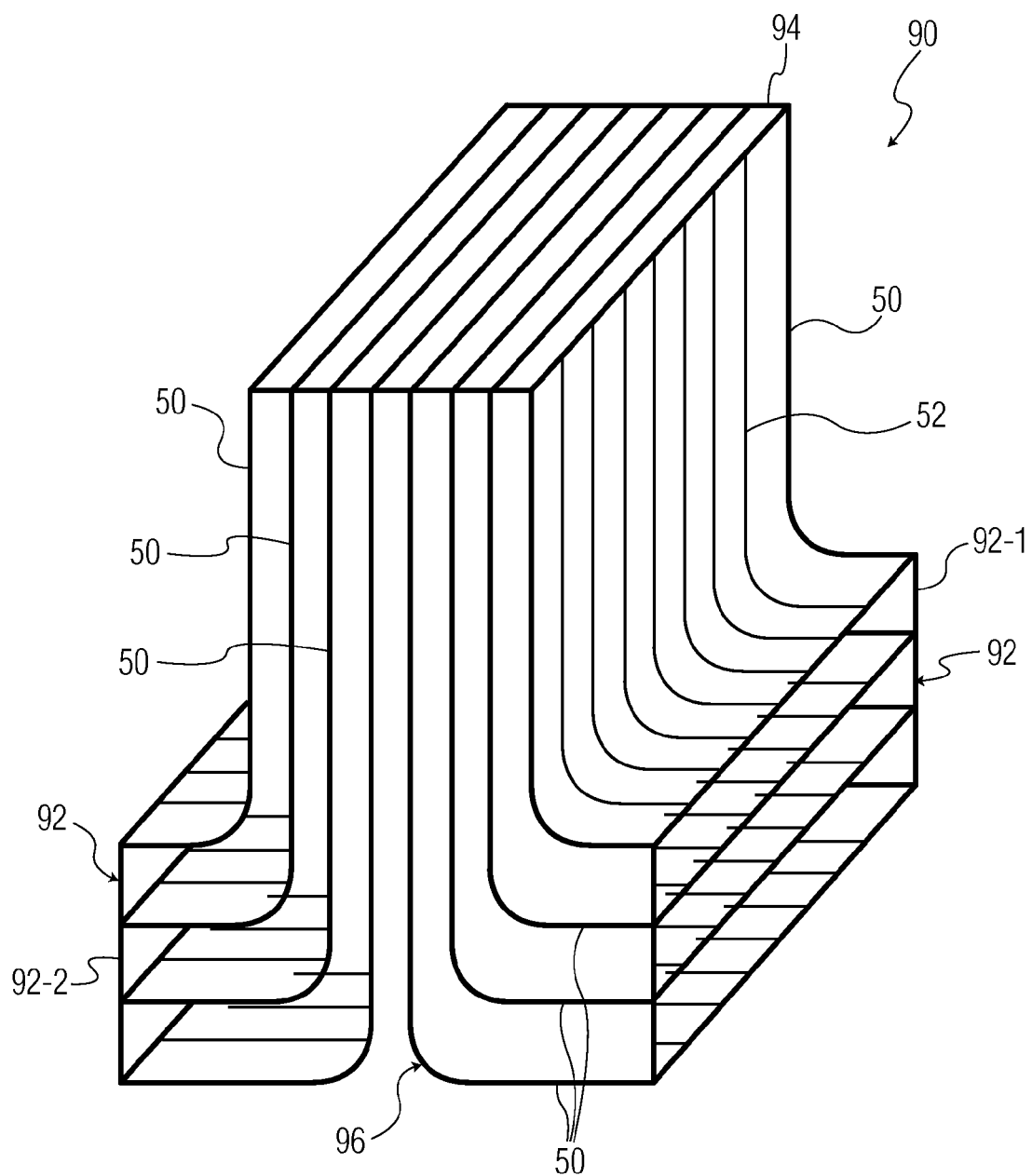
FIG. 14 is a plan view of a redistribution interconnect according to another embodiment of the present disclosure.

The use of flexible circuits in the interconnect block also provides opportunities for forming a redistribution interconnect wherein the two interconnect surfaces are not parallel to each other. Such a redistribution interconnect 90 is illustrated in FIG. 14, where each of the interconnect layers 50 undergoes a right-angle bend, for example, as indicated by reference numeral 96, between the first surface 92 and the second surface 94. In this embodiment, the first surface includes two surfaces 92-1 and 92-2 oriented perpendicular to the second surface 94. This approach is advantageous for applications where more surface area is required for the ICs than can be provided behind the transducer array, even with redistribution interconnect.

Figure 15:
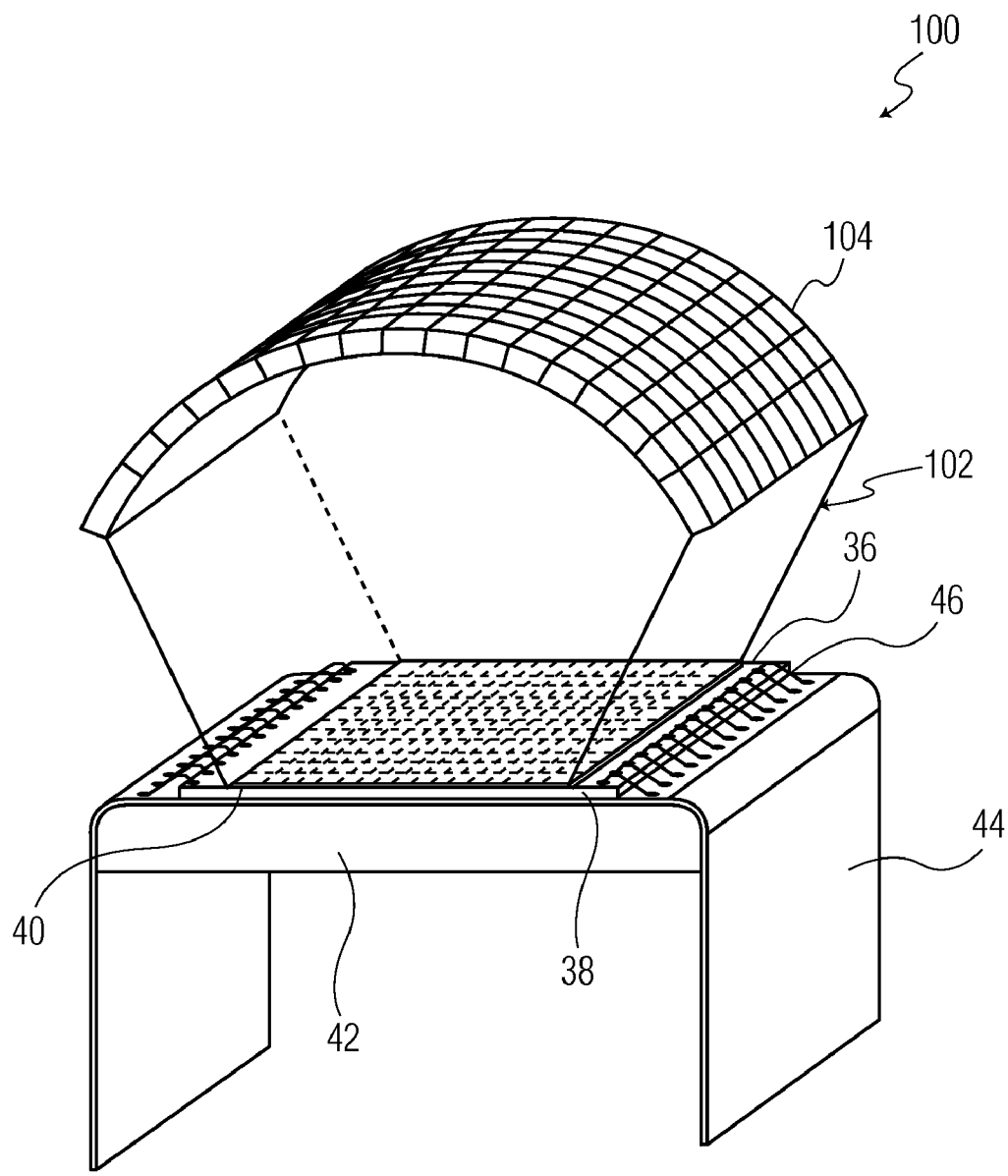
FIG. 15 is a plan view of an curved linear array ultrasound transducer featuring a redistribution interconnect according to yet another embodiment of the present disclosure.

FIG. 15 is a plan view of a curved linear array ultrasound transducer 100 featuring redistribution interconnect 102 according to yet another embodiment of the present disclosure. This embodiment is similar to those discussed and described herein with respect to FIGS. 3-6, however, as applied to a curved two dimensional transducer array 104. In this embodiment, the elements of the transducer array 104 form a curved surface, while the surface of the microbeamformer IC 38 is a flat surface. The redistribution interconnect 102 provides the physical remapping required to connect the curved transducer array 104 to the flat microbeamformer IC 38. Accordingly, the embodiment of FIG. 15 enables curved transducer array designs. The techniques used to build the redistribution interconnect 102 may derive from those illustrated in FIGS. 4-9, with the additional feature of providing the curved surface for the transducer array 104.

Figure 16A:
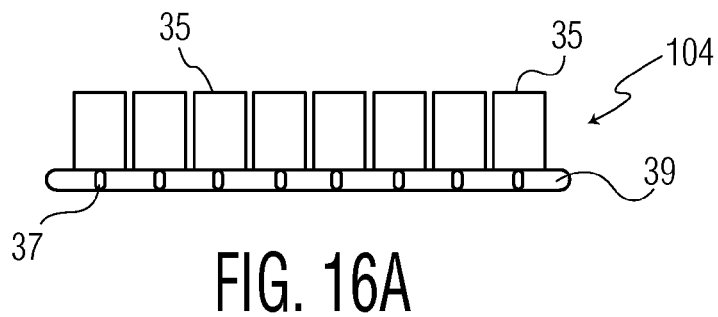
FIG. 16 is a schematic plan view of a portion of a redistribution interconnect for a curved linear array ultrasound transducer according to the yet another embodiment of the present disclosure.
Figure 16B:
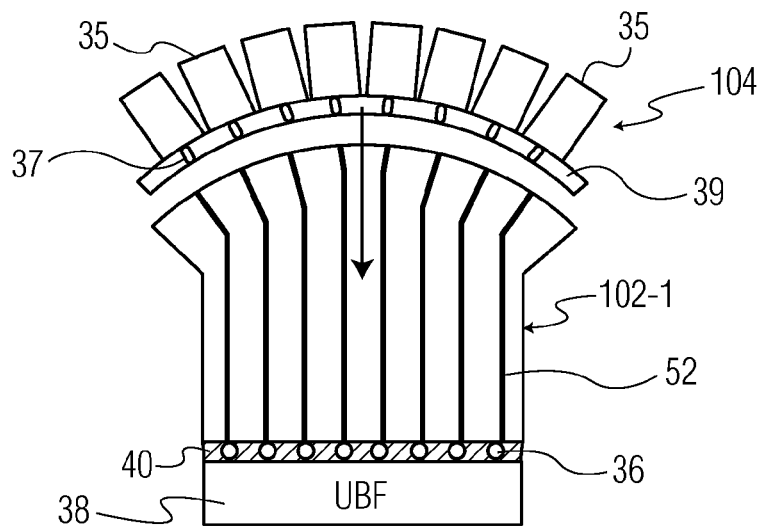
Figure 16C:
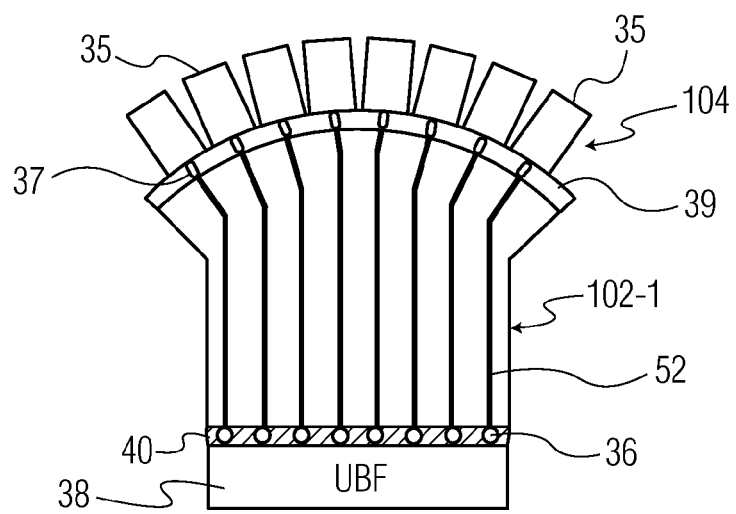

FIG. 16 includes a schematic plan view of a portion of redistribution interconnect 102-1 for a curved linear array ultrasound transducer 100-1 according to another embodiment of the present disclosure. Redistribution interconnect 102-1 comprises a redistribution interconnect similar to the embodiments described and discussed herein above for signal redistribution with respect to FIGS. 3-6. In particular, redistribution interconnect 102-1 provides separate vertically disposed conductive traces 52 for each element 35 of the curved transducer array 104, as illustrated in FIG. 16. The transducer elements 35 of the curved transducer array 104 couple to a corresponding conductive trace 52 of interconnect block 102-1. In addition, the bond pads of the microbeamformer IC 38 are coupled to a second surface of redistribution interconnect 102-1 via flip-chip conductive bumps 36. A flip-chip underfill material 40 may be included within a region between the integrated circuit 38 and the bottom surface of redistribution interconnect block 102-1, surrounding the flip-chip conductive bumps 36.

With respect to curved arrays, a major challenge in making 2D curved arrays has been in providing an interconnection between the individual elements 35 of the transducer array 104 and the individual wires 52 in the redistribution interconnect 102-1. It is necessary for the transducer array 104 to be sufficiently flexible to conform to the curved surface of the redistribution interconnect 102-1. In one embodiment, a method for accomplishing this is by using a composite material to form the transducer array 104. The composite material is formed using techniques known in prior art, and is sufficiently flexible that the transducer array 104 can conform to the corresponding curved surface of the redistribution interconnect 102-1. Once the transducer array 104 is conformed and bonded to the curved surface of the redistribution interconnect 102-1, the array is diced into individual elements 35.

A common method of building curved one-dimensional arrays is to build a flat array on a substrate or "carrier" made of a material that, when sufficiently thin, is also sufficiently flexible that it can be conformed to the desired radius of curvature. Because of manufacturing tolerances, the dicing cuts that separate the array into individual elements typically also enter the carrier, but it is necessary for some thickness of the carrier to remain to provide mechanical support for the array elements during subsequent processing prior to being permanently bonded into the curved form. Therefore, if the carrier is conductive and homogeneous, electrical connections to individual elements cannot be brought through the carrier, and the carrier must therefore be a common electrode for all elements of the array.

Figure 1:
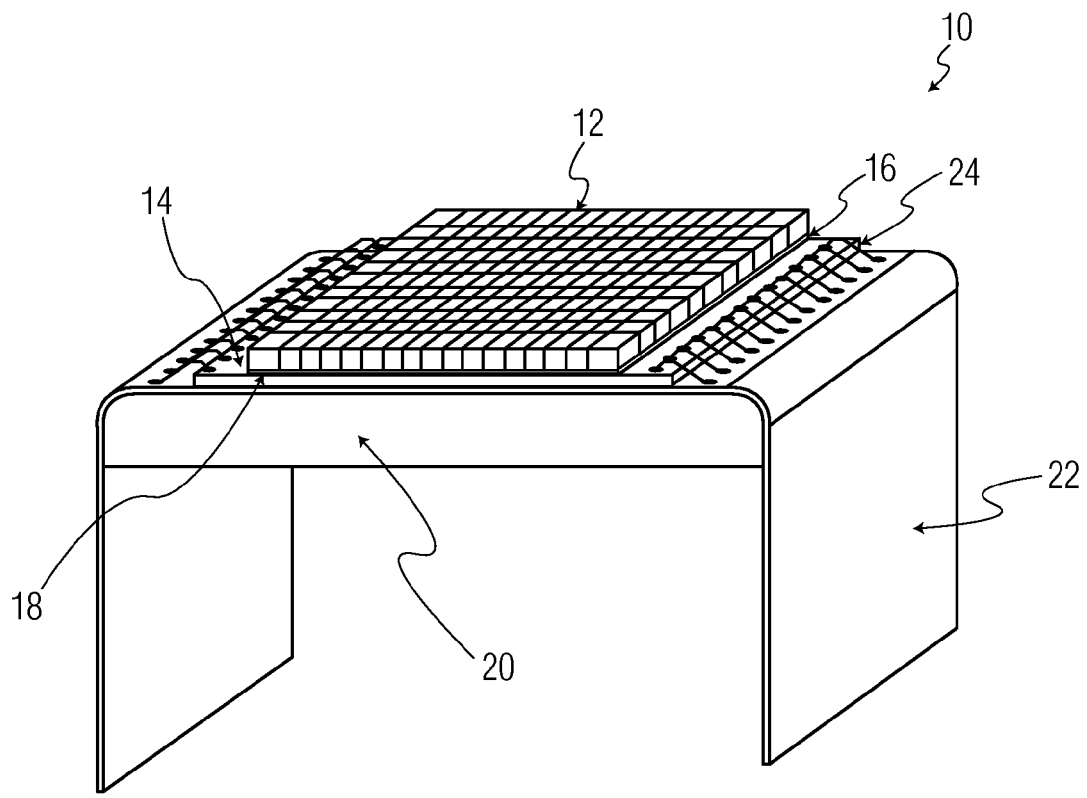
FIG. 1 is a plan view of an ultrasound transducer known in the art comprising a 2D array manufactured using flip-chip interconnect between the microbeamformer IC and the acoustic elements.
Figure 2:
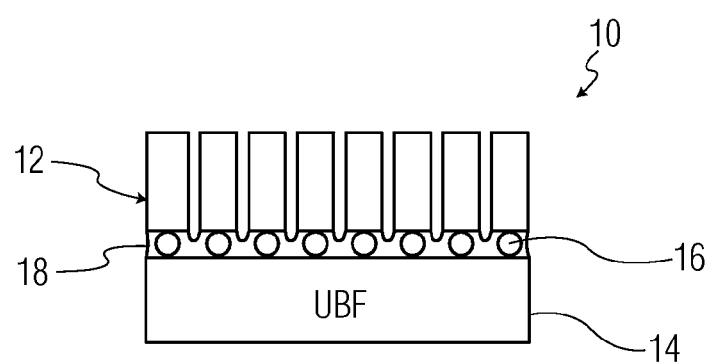
FIG. 2 is a schematic cross-section view of a portion of an ultrasound transducer known in the art.

Referring still to FIG. 16, the curved array ultrasound transducer according to yet another embodiment of the present disclosure provides for a carrier with non-homogeneous electrical conductivity. The carrier provides separate interconnects from its top surface through its thickness to its back surface. For example, the carrier can comprise a flexible circuit 39 with separate vias 37 connecting interconnect pads for each element 35 on each surface (FIG. 16-1). The carrier substrate is sufficiently thick to provide mechanical support for the array during processing necessary to conform the array to the desired radius of curvature (FIG. 16-2) and to bond it to the redistribution interconnect (FIG. 16-3).

Figure 17:
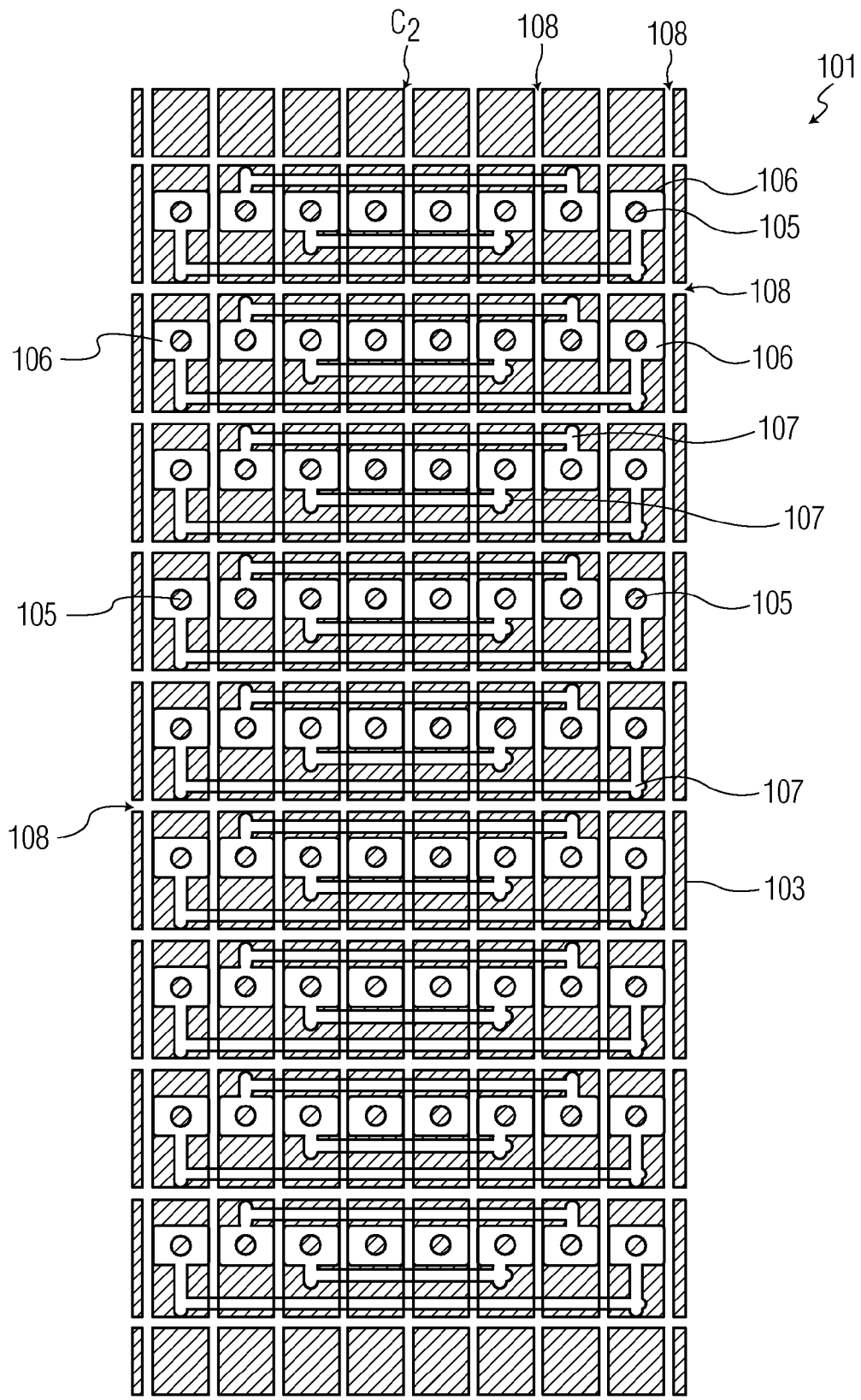
FIG. 17 is a top view of the redistribution interconnect of FIG. 16 according to another embodiment of the present disclosure.

In some cases, the presence of a carrier provides an opportunity to include some additional functionality in the carrier component. For example, a two-dimensional array can be operated in a manner that is symmetrical across the center of the elevation dimension; i.e., at each specific azimuth position, wherein pairs of two elements spaced equally from the center of the elevation direction are connected together electrically. This format, referred to herein as "row pairing", is typically used in expanding aperture (1.25D) and elevation focus (1.5D) applications. The inclusion of row pairing interconnect in the carrier reduces by a factor of two the number of electrical signals that must be brought off of the transducer array through the redistribution interconnect. FIG. 17 is a schematic illustration of a carrier that includes row-pairing interconnects according to one embodiment of the present disclosure. In FIG. 17, the carrier 101 comprises a flexible circuit with at least two interconnect layers 103 (only one layer is illustrated) and vias 105 providing connections between the at least two interconnect layers. The top interconnect layer comprises surface pads 106 for connecting to the transducer array (not shown). The underlying interconnect layer (or layers) have pads for connecting to the redistribution interconnect, as well as row-pair element connections 107. By keeping the row-pair element connections on interconnect layers other than the top layer, the dicing cuts 108 that separate the individual array elements may protrude slightly down into the carrier material while not severing the row-pair element connections. The remaining carrier material of the interconnect layers provides mechanical support for the transducer array during subsequent processing, including bonding to the redistribution interconnect.

It should be noted that while the flexible carrier is a necessary component of this embodiment of a curved two-dimensional array, a carrier with row pairing element connections may also be advantageously used with a flat array to reduce the number of electrical connections that must be brought off of the array through the redistribution interconnect. In this case, however, flexibility of the carrier is incidental, and the carrier could be made of a non-flexible material.

It should be further noted that, especially for high-frequency arrays, the azimuthal pitch of the elements may be too small to permit row pairing element connections to be included in the carrier. In this case, the row pairing element connections may be made on the surface of the redistribution interconnect opposite the array, where the pitch of the interconnect can be larger and the location of the redistribution interconnect pads need not be the same as the location of the array elements.

Figure 18:
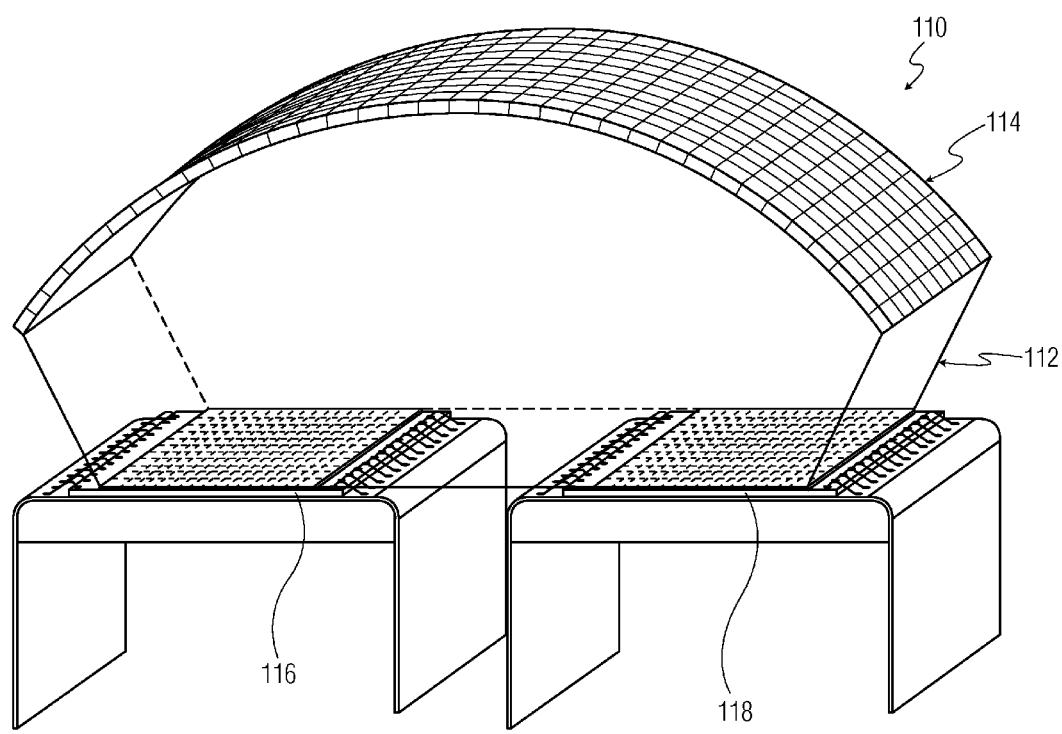
FIG. 18 is a plan view of a curved linear array ultrasound transducer featuring a redistribution interconnect for two or more microbeamformers according to yet another embodiment of the present disclosure.

FIG. 18 is a plan view of a curved linear array ultrasound transducer 110 featuring redistribution interconnect 112 for coupling a transducer array 114 to two or more microbeamformer ICs (116,118) according to yet another embodiment of the present disclosure. In this embodiment, a single curved transducer array 114 and multiple microbeamformer IC's (116,118) are connected to the redistribution interconnect (or interconnecting block) 112. The redistribution interconnect can comprise one similar to the embodiments described herein with respect to FIGS. 15 and 16, further as applied to two or more tiled microbeamformer ICs (116,118). For example, redistribution interconnect 112 is configured for providing the required pitch matching for the bond pads of the multiple microbeamformer IC's (116,118) at a first side, while providing the required pitch matching for the transducer elements of the curved 2D transducer array 114 at the opposite side. Accordingly, this embodiment enables the fabrication of very large element count curved transducers. In addition, more than two microbeamformer ICs may be used. The techniques used to build the redistribution interconnect 112 may derive from those illustrated in FIGS. 11-13, with the additional feature of providing the curved surface for the transducer array 114.

Figure 19:
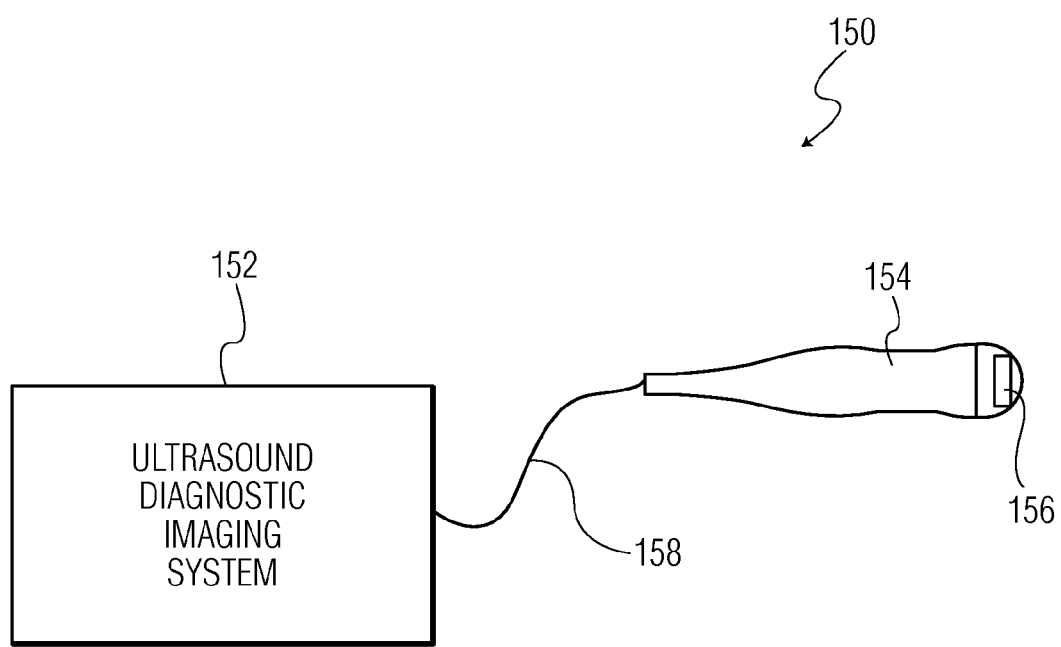
FIG. 19 is a block diagram view of an ultrasound diagnostic imaging system with an ultrasound transducer according to an embodiment of the present disclosure.

FIG. 19 is a block diagram view of an ultrasound diagnostic imaging system 150 with an ultrasound transducer according to an embodiment of the present disclosure. Ultrasound diagnostic imaging system 150 includes a base unit 152 adapted for use with ultrasound transducer probe 154. Ultrasound transducer probe 154 includes ultrasound transducer 156, wherein ultrasound transducer 156 includes one of the embodiments as discussed herein with respect to FIGS. 3-18. Base unit 152 includes suitable electronics for performing ultrasound diagnostic imaging according to the requirements of a particular ultrasound diagnostic application. Ultrasound transducer probe 154 couples to base unit 152 via a suitable connection 158, for example, an electronic cable, a wireless connection, or other suitable means. Ultrasound diagnostic imaging system 150 can be used for performing various types of medical diagnostic ultrasound imaging. In addition, the ultrasound transducer application can include a cardiac application, an abdominal application, a transosophageal (TEE) application, or other diagnostic or therapeutic ultrasound application.

It should be further noted that the materials comprising the redistribution interconnect can be designed as part of the acoustic design of the ultrasound transducer. For example, the redistribution interconnect can be designed to have specific attenuation, acoustic velocity, acoustic impedance, etc. that advantageously contribute to the acoustic performance of the transducer array.

According to the embodiments of the present disclosure, many of the advantages of the flip-chip architecture are provided while addressing some of its limitations by introducing an application-specific interconnect redistribution block (or redistribution interconnect) into the acoustic stack. As used herein, the connection to the array of acoustic elements in some of the present embodiments has been described as flip-chip connections, however, the attachment mechanism could also include something different from flip-chip connections. That is, the term "flip-chip" could also refer to electrical interconnection using something other than conductive bumps. The present embodiments also enable potential applications for two-dimensional (2D) arrays with microbeamformer ICs having form factors that permit or are suitable for incorporating the extra size and weight of the redistribution interconnect block. In addition, the array of acoustic elements can have a shape that is different from a foot-print of the one or more microbeamformer integrated circuit chips.

The present embodiments advantageously provide for the mapping of a planar two-dimensional array geometry to a different planar integrated circuit (IC) ASIC geometry. The embodiments further provide for mapping a curved two-dimensional array geometry to a different planar integrated circuit (IC) geometry. In another embodiment, the ASIC resides substantially in the "shadow" of the acoustic transducer, rather than being laterally displaced.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The invention claimed is:

1. An ultrasound transducer comprising:
   one or more microbeamformer integrated circuit chips, each including a plurality of bond pads;
   a two-dimensional array of acoustic elements; and
   a redistribution interconnect having a plurality of interconnect layers, each layer having a plurality of interconnect traces electrically coupled on a first side to the bond pads of the one or more microbeamformer integrated circuit chips and on a second side to the transducer elements, the redistribution interconnect providing an interconnection between the bond pads of the one or more microbeamformer integrated circuit chips with corresponding ones of the acoustic elements of the array,
   wherein on the first side the plurality of interconnect traces have a first pitch set in azimuth and elevation directions and on the second side the plurality of interconnect traces have a second pitch set in azimuth and elevation directions, the first and second pitch are different.

2. The ultrasound transducer of claim 1, wherein the redistribution interconnect is configured to enable electrical coupling of the array of acoustic elements with the one or more microbeamformer integrated circuit chips, the array of acoustic elements having a shape different from a foot-print of the one or more microbeamformer integrated circuit chips.

3. The ultrasound transducer of claim 1, wherein the redistribution interconnect comprises a multilayer laminated interconnection block.

4. The ultrasound transducer of claim 3, wherein the laminated interconnection block includes the plurality of interconnect layers, each interconnect layer including the interconnect traces patterned to provide electrical signal redistribution between a portion of the bond pads of the one or more microbeamformer integrated circuit chips and a corresponding portion of the array of acoustic elements.

5. The ultrasound transducer of claim 4, wherein the interconnect layers comprise flexible or rigid printed circuit boards.

6. The ultrasound transducer of claim 1, wherein the redistribution interconnect comprises a block including the plurality of interconnect layers, wherein the plurality of interconnect layers have no interconnects between themselves.

7. The ultrasound transducer of claim 6, wherein each layer includes in-plane patterned conductors, the in-plane patterned conductors providing a given signal redistribution of a particular combination of transducer array elements and the one or more microbeamformer integrated circuit chips.

8. The ultrasound transducer of claim 1, wherein the redistribution interconnect comprises a plurality of conductors cast in a non-conductive material.

9. The ultrasound transducer of claim 8, further wherein each of the plurality of conductors provides electrical signal redistribution between a portion of the bond pads of the one or more microbeamformer integrated circuit chips and a corresponding portion of the array of acoustic elements.

10. The ultrasound transducer of claim 1, wherein the redistribution interconnect comprises an out-of-plane redistribution block including an epoxy fill with leadframe, printed circuit board, or flexible circuit board interconnect layers.

11. The ultrasound transducer of claim 1, wherein the array of acoustic elements comprises a linear array of acoustic elements or a curved array of acoustic elements.

12. The ultrasound transducer of claim 1, wherein the one or more microbeamformer integrated circuit chips comprises two integrated circuit chips.

13. An ultrasound transducer comprising:
   one or more microbeamformer integrated circuit chips, each including a plurality of bond pads;
   a flat array of acoustic elements or a curved array of acoustic elements; and
   a redistribution interconnect having a plurality of interconnect layers, each layer having a plurality of interconnect traces coupled on a first side to the bond pads of the one or more microbeamformer integrated circuit chips and on a second side to the transducer elements, the redistribution interconnect providing an interconnection between the bond pads of the one or more microbeamformer integrated circuit chips with corresponding ones of the acoustic elements of the array, on the first side the plurality of interconnect traces have a first pitch set in azimuth and elevation directions and on the second side the plurality of interconnects have a second pitch set in azimuth and elevation directions, the first and second pitch are different,
   wherein the redistribution interconnect is configured to enable electrical coupling of the array of acoustic elements with the one or more microbeamformer integrated circuit chips, the array of acoustic elements having a shape different from a foot-print of the one or more microbeamformer integrated circuit chips.

14. The ultrasound transducer of claim 13, wherein the redistribution interconnect comprises a multilayer laminated interconnection block or a plurality of conductors cast in a non-conductive material.

15. The ultrasound transducer of claim 14, further wherein the laminated interconnection block includes a plurality of printed circuit boards, and each printed circuit board provides electrical signal redistribution between a portion of the bond pads of the one or more microbeamformer integrated circuit chips and a corresponding portion of the array of acoustic elements.

16. The ultrasound transducer of claim 14, still further wherein each of the plurality of conductors provides electrical signal redistribution between a portion of the bond pads of the one or more microbeamformer integrated circuit chips and a corresponding portion of the array of acoustic elements.

17. The ultrasound transducer of claim 14, wherein the redistribution interconnect comprises a redistribution block including an epoxy fill with leadframe, printed circuit board, or flexible circuit board interconnect layers.

18. A method of making an ultrasound transducer, the method comprising acts of:
providing one or more microbeamformer integrated circuit chips, each including a plurality of bond pads;
providing a two-dimensional array of acoustic elements; and
coupling the array of acoustic elements to the one or more microbeamformer integrated circuit chips using a redistribution interconnect having a plurality of interconnect layers, each layer having a plurality of interconnect traces electrically coupled on a first side to the bond pads of the one or more microbeamformer integrated circuit chips and on a second side to the transducer elements, the redistribution interconnect providing an interconnection between the bond pads of the one or more microbeamformer integrated circuit chips with corresponding ones of the acoustic elements of the array,
wherein on the first side the plurality of interconnect traces have a first pitch set in azimuth and elevation directions and on the second side the plurality of interconnects have a second pitch set in azimuth and elevation directions, the first and second pitch are different.

19. The method of claim 18, wherein the array of acoustic elements have a shape different from a foot-print of the one or more microbeamformer integrated circuit chips.

20. The method of claim 18, wherein the redistribution interconnect comprises a multilayer laminated interconnection block, further wherein the laminated interconnection block includes a plurality of interconnect layers, and each interconnect layer including interconnect traces patterned to provide electrical signal redistribution between a portion of the bond pads of the one or more microbeamformer integrated circuit chips and a corresponding portion of the array of acoustic elements, still further wherein the interconnect layers comprise flexible or rigid printed circuit boards.

21. The method of claim 18, wherein providing the redistribution interconnect comprises providing a block having multiple layers of a planar interconnect, wherein the multiple layers have no interconnects between individual ones of the multiple layers, wherein each layer includes in-plane patterned conductors, the in-plane patterned conductors providing a given signal redistribution of a particular combination of transducer array elements and the one or more microbeamformer integrated circuit chips.

22. The method of claim 18, wherein providing the redistribution interconnect comprises casting a plurality of conductors in a non-conductive material, further wherein each of the plurality of conductors provides electrical signal redistribution between a portion of the bond pads of the one or more microbeamformer integrated circuit chips and a corresponding portion of the array of acoustic elements.

23. The method of claim 18, wherein the redistribution interconnect comprises a redistribution block including an epoxy fill with leadframe, printed circuit board, or flexible circuit board interconnect layers.

24. The method of claim 18, wherein the array of acoustic elements comprises a linear array of acoustic elements or a curved array of acoustic elements.

25. The method of claim 18, wherein the one or more microbeamformer integrated circuit chips comprises two integrated circuit chips.

* * * * *